US012656795B2

(12) United States Patent
Wei et al.

(10) Patent No.: US 12,656,795 B2
(45) Date of Patent: Jun. 16, 2026

(54) CONFIGURING COLOR TO BE DISPLAYED BY LIGHTING DEVICE

(71) Applicant: APUTURE IMAGING INDUSTRIES CO., LTD., Shenzhen (CN)

(72) Inventors: Rujian Wei, Shenzhen (CN); Guolin Huang, Shenzhen (CN)

(73) Assignee: APUTURE IMAGING INDUSTRIES CO., LTD., Shenzhen (CN)

( * ) Notice: Subject to any disclaimer, the term of this patent is extended or adjusted under 35 U.S.C. 154(b) by 279 days.

(21) Appl. No.: 18/494,283

(22) Filed: Oct. 25, 2023

(65) Prior Publication Data

US 2024/0053780 A1    Feb. 15, 2024

Related U.S. Application Data

(63) Continuation of application No. PCT/CN2021/125471, filed on Oct. 22, 2021.

(30) Foreign Application Priority Data

Apr. 30, 2021    (CN) .......................... 202110485431.1

(51) Int. Cl.
*G05D 25/02*    (2006.01)
(52) U.S. Cl.
CPC .................................... *G05D 25/02* (2013.01)
(58) Field of Classification Search
CPC ...... G05D 25/02; H05B 47/196; H05B 45/20; Y02B 20/40
See application file for complete search history.

(56) References Cited

U.S. PATENT DOCUMENTS

2002/0089513 A1* 7/2002 Blanchard ............... G01J 3/528
                                                        345/589
2007/0254630 A1* 11/2007 Moloney ................. H04L 63/06
                                                        455/410
(Continued)

FOREIGN PATENT DOCUMENTS

CN        2797082 Y     7/2006
CN      101523990 A     9/2009
(Continued)

OTHER PUBLICATIONS

International Search Report and Written Opinion issued in PCT/CN2021/125471, dated Jan. 26, 2022, 16 pages provided, with English translation.
(Continued)

*Primary Examiner* — King Y Poon
*Assistant Examiner* — Patrick P Galera
(74) *Attorney, Agent, or Firm* — HSML P.C.

(57) ABSTRACT

A method of configuring a color to be displayed by a lighting device includes: in response to determining that a target color disc mode of a plurality of preset color disc modes is set by a user, obtaining one or more initial color points according to a preset color point selection strategy for the target color disc mode; generating a color disc based on the one or more initial color points, wherein the color disc comprises a plurality of color points, and each of the plurality of color points corresponds to a color; and performing color configuring on the lighting device by using the plurality of color points included in the color disc.

19 Claims, 7 Drawing Sheets

In response to a target color disc mode set by a user in preset multiple color disc modes, one or more initial color points is obtained according to a preset color point selection strategy for the target color disc    11

The color disc is generated according to one or more initial color points    12

A color configuring is performed on a lighting device by using multiple color points in the color disc    13

(56) References Cited

U.S. PATENT DOCUMENTS

| | | | |
|---|---|---|---|
| 2008/0265798 A1 | 10/2008 | Huang et al. | |
| 2016/0150616 A1* | 5/2016 | Bell | F21V 14/08 |
| | | | 315/294 |
| 2017/0354019 A1* | 12/2017 | Julian | G06F 3/04847 |

FOREIGN PATENT DOCUMENTS

| | | | |
|---|---|---|---|
| CN | 102986296 | A | 3/2013 |
| CN | 103069209 | A | 4/2013 |
| CN | 104113971 | A | 10/2014 |
| CN | 105282917 | A | 1/2016 |
| CN | 107479839 | A | 12/2017 |
| CN | 108280865 | A | 7/2018 |
| CN | 109948184 | A | 6/2019 |
| CN | 110673487 | A | 1/2020 |
| CN | 110677955 | A | 1/2020 |
| CN | 111903117 | A | 11/2020 |
| CN | 111984164 | A | 11/2020 |
| CN | 113238598 | A | 8/2021 |
| WO | 2018021568 | A1 | 2/2018 |

OTHER PUBLICATIONS

Notice of Allowance issued in corresponding Chinese Application No. CN202110485431.1, dated Apr. 13, 2022, with English translation.

Office Action issued in corresponding Chinese Application No. CN202110485431.1, dated Nov. 3, 2021, with English translation.

* cited by examiner

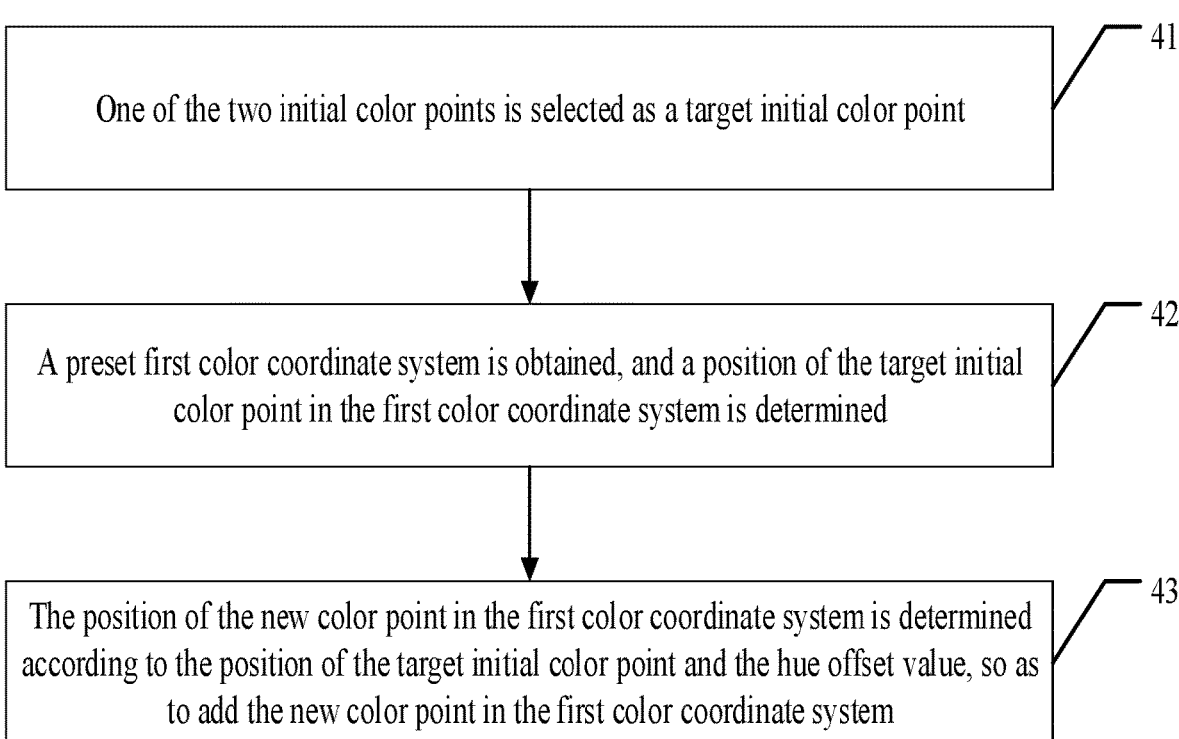

One of the two initial color points is selected as a target initial color point — 41

A preset first color coordinate system is obtained, and a position of the target initial color point in the first color coordinate system is determined — 42

The position of the new color point in the first color coordinate system is determined according to the position of the target initial color point and the hue offset value, so as to add the new color point in the first color coordinate system — 43

FIG. 4

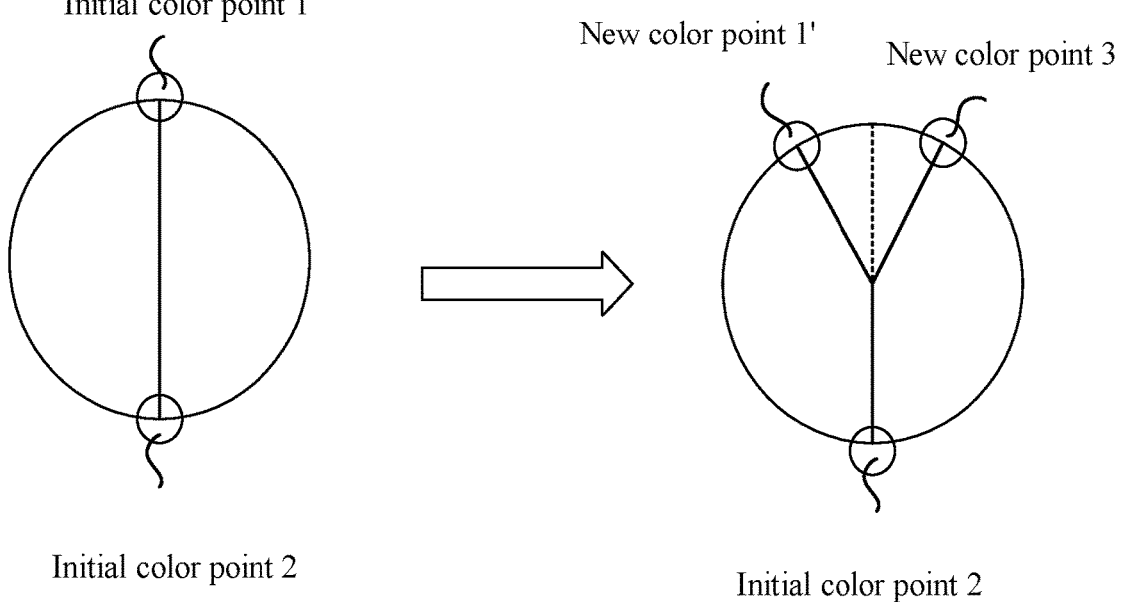

Initial color point 1

New color point 1'    New color point 3

Initial color point 2

Initial color point 2

FIG. 5

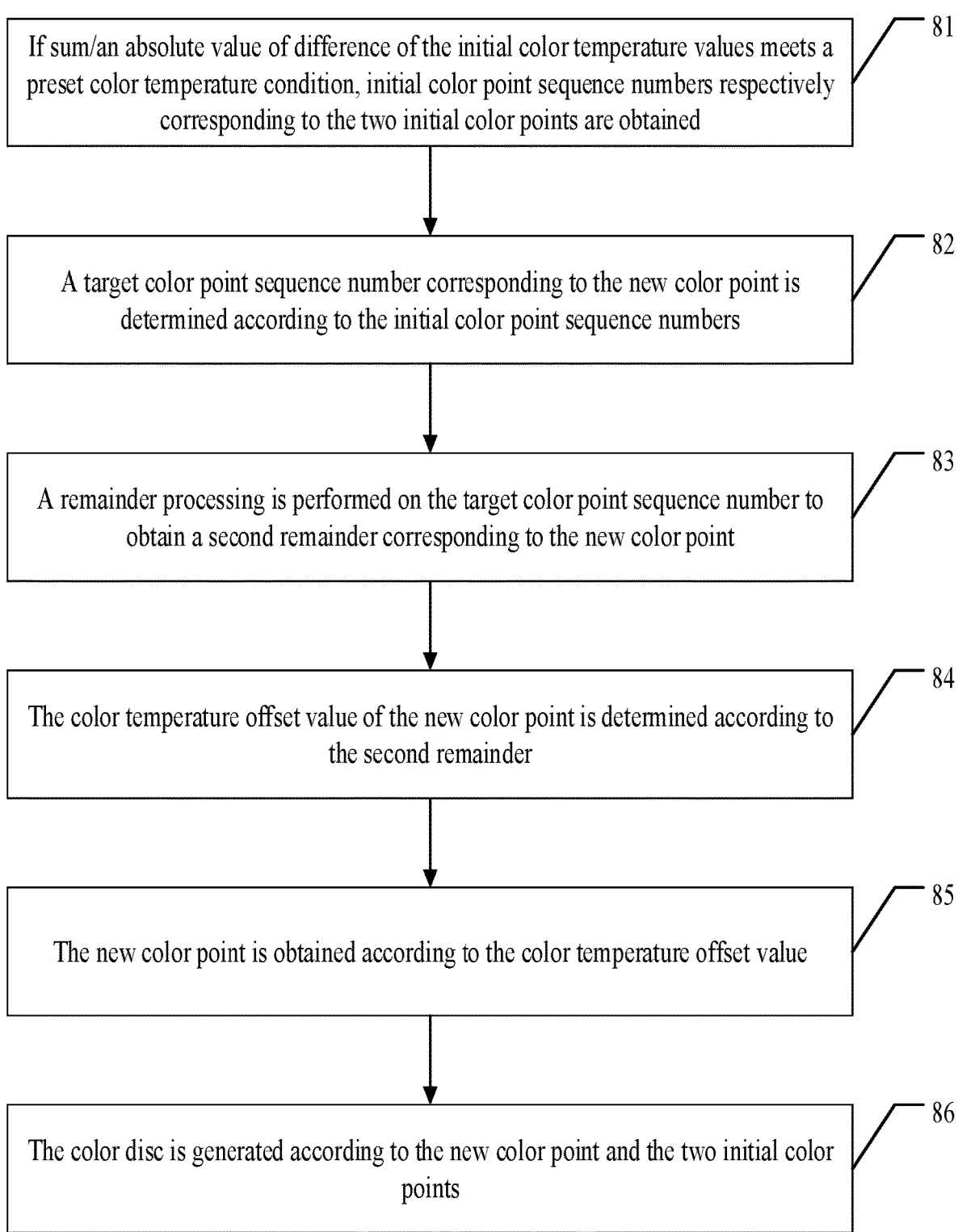

If sum/an absolute value of difference of the initial color temperature values meets a preset color temperature condition, initial color point sequence numbers respectively corresponding to the two initial color points are obtained — 81

A target color point sequence number corresponding to the new color point is determined according to the initial color point sequence numbers — 82

A remainder processing is performed on the target color point sequence number to obtain a second remainder corresponding to the new color point — 83

The color temperature offset value of the new color point is determined according to the second remainder — 84

The new color point is obtained according to the color temperature offset value — 85

The color disc is generated according to the new color point and the two initial color points — 86

FIG. 8

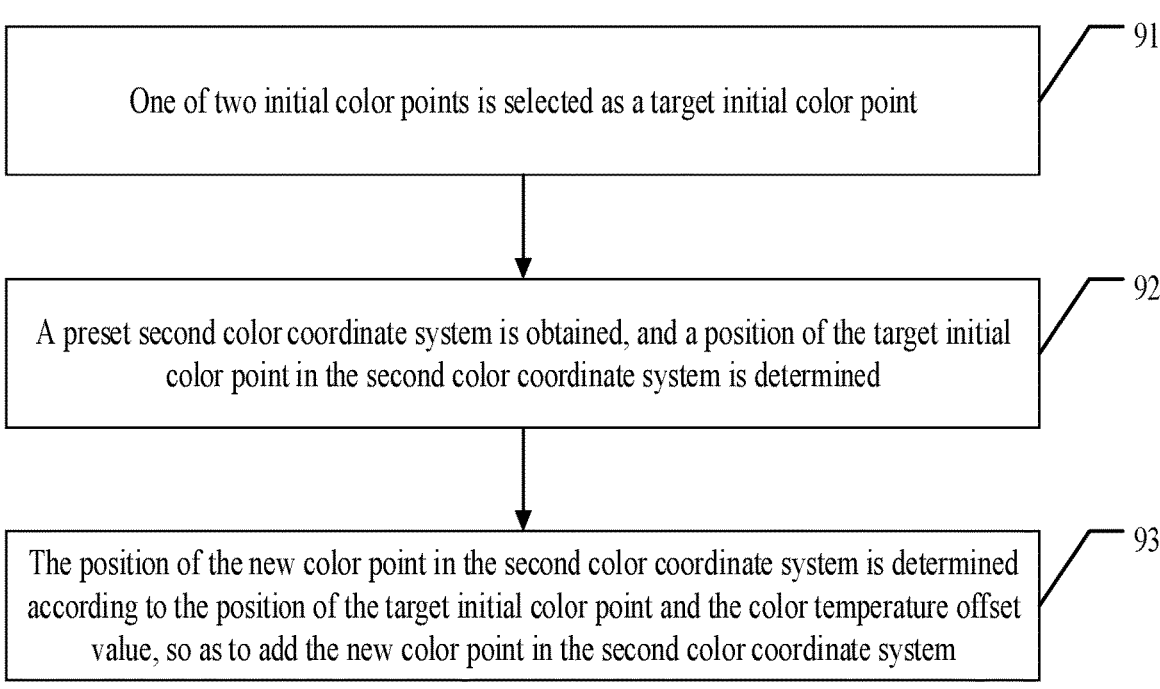

One of two initial color points is selected as a target initial color point ⟋ 91

A preset second color coordinate system is obtained, and a position of the target initial color point in the second color coordinate system is determined ⟋ 92

The position of the new color point in the second color coordinate system is determined according to the position of the target initial color point and the color temperature offset value, so as to add the new color point in the second color coordinate system ⟋ 93

FIG. 9

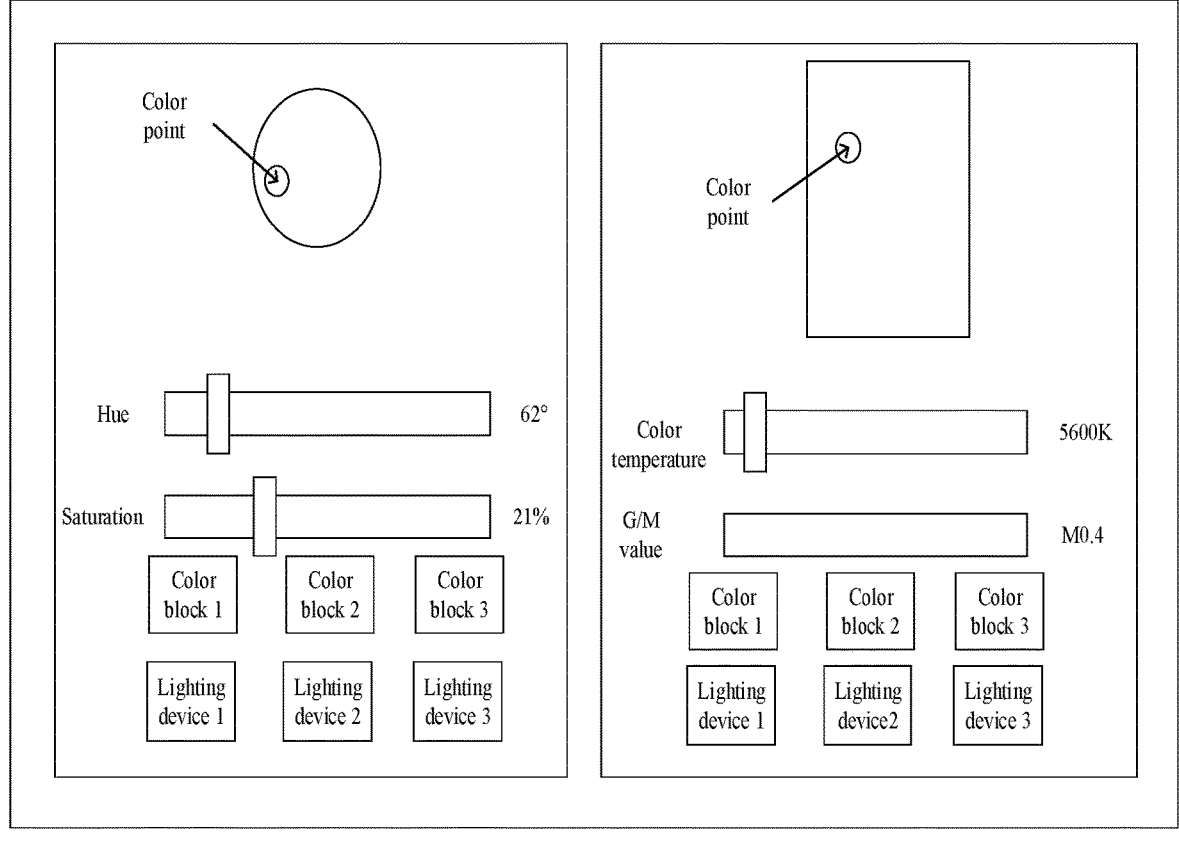

FIG. 10

CONFIGURING COLOR TO BE DISPLAYED BY LIGHTING DEVICE

CROSS-REFERENCE TO RELATED APPLICATIONS

This application is a continuation application of International Application No. PCT/CN2021/125471, filed on Oct. 22, 2021, which claims priority to Chinese Application No. 202110485431.1, filed on Apr. 30, 2021. The disclosures of the above applications are incorporated herein by reference in their entireties.

FIELD

The present disclosure relates to lighting device control technologies, and more particularly, to configuring a color to be displayed by a lighting device.

BACKGROUND

Due to advantages of a light-emitting diode, for example, having a long service life, relatively low power consumption and the like, more and more lighting devices use light-emitting diodes as light sources. With the development of mobile Internet, more and more lighting devices need to be connected to smart terminals through which parameters of the lighting devices such as brightness, color and the like can be adjusted.

Generally, efficiency of a smart terminal in controlling relevant parameters of lighting devices is not high enough. Especially when multiple lighting devices are involved, a user needs to separately set a brightness, color, and the like for each lighting device. In addition, in some application scenarios, when a more professional user generates a color disc, more professional and precise control of colors to be displayed by lighting devices is usually required. However, the operation interface is not friendly to such a professional creator and the control efficiency is not high, so that it is difficult to control the lighting devices to produce expected light effect efficiently.

SUMMARY

According to one or more embodiments of the present disclosure, a method of configuring a color to be displayed by a lighting device includes:

in response to a target color disc mode set by a user in preset multiple color disc modes, obtaining one or more initial color points according to a preset color point selection strategy for the target color disc mode;

generating a color disc based on the one or more initial color points, the color disc including multiple color points, each of the multiple color points corresponding to one color; and perform a color configuring on the lighting device by using multiple color points in the color disc.

According to one or more embodiments of the present disclosure, an apparatus for configuring a color to be displayed by a lighting device includes:

a color point selecting module, configured to in response to a target color disc mode set by a user in preset multiple color disc modes, obtain one or more initial color points according to a preset color point selection strategy for the target color disc mode;

a color disc generating module, configured to generate a color disc based on the one or more initial color points, the color disc including multiple color points, each of the multiple color points corresponding to one color; and a color configuring module, configured to perform a color configuring on the lighting device by using multiple color points in the color disc.

According to one or more embodiments of the present disclosure, a server includes:

one or more processors;

a memory; and one or more applications, the one or more applications being stored in the memory and being executed by the processor to implement the above color configuring method of the lighting device.

According to one or more embodiments of the present disclosure, a storage medium stores multiple instructions, the instructions being adapted to be loaded by a processor to perform steps in the above color configuring method of the lighting device.

BRIEF DESCRIPTION OF THE DRAWINGS

FIG. 4 is a schematic flowchart of a process of obtaining new color points based on a hue offset value according to one or more embodiments of the present disclosure.

FIG. 5 is a schematic diagram of the obtained new color points according to one or more embodiments of the present disclosure.

FIG. 8 is a schematic flowchart of a process of generating a color disc based on two initial color points according to one or more embodiments of the present disclosure.

FIG. 9 is a schematic flowchart of a process of obtaining new color points based on a color temperature offset value according to one or more embodiments of the present disclosure.

FIG. 10 is a schematic diagram of an operation interface according to one or more embodiments of the present disclosure.

DETAILED DESCRIPTION

Figures 1, 2:
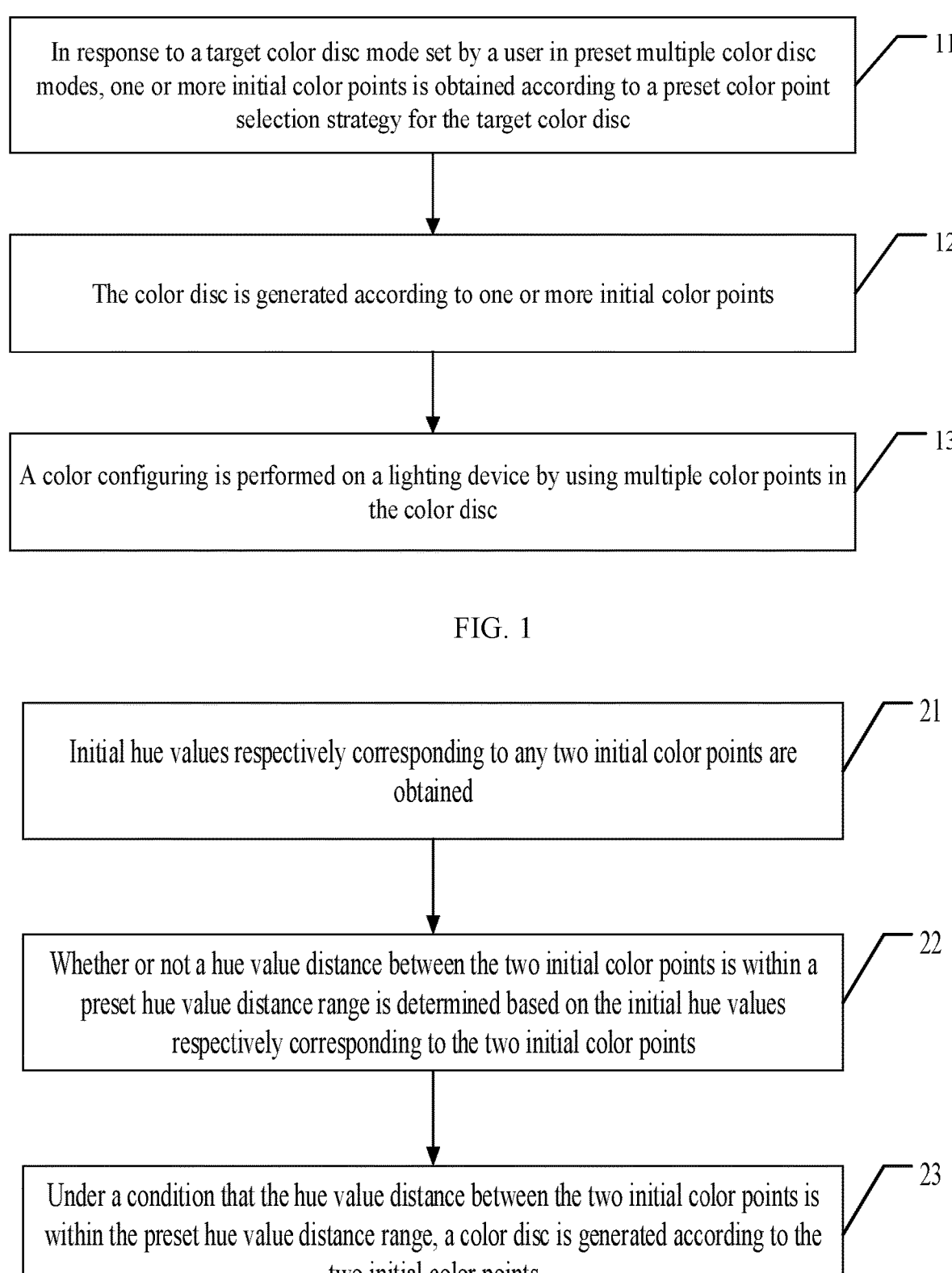
FIG. 1 is a schematic flowchart of a method of configuring a color to be displayed by a lighting device according to one or more embodiments of the present disclosure.
FIG. 2 is a schematic flowchart of a process of generating a color disc based on multiple initial color points according to one or more embodiments of the present disclosure.

Some embodiments of the present disclosure will be described in detail below with reference to the accompanying drawings. The embodiments are described for illustrative purposes only and are not intended to limit the present disclosure.

In the description of the present disclosure, it is to be understood that terms "first" and "second" are used for descriptive purposes only and are not to be construed as indicating or implying relative importance or implying number of indicated technical features. Thus, features limited by "first" and "second" may explicitly or implicitly include one or more features. In the description of the present disclosure, "multiple" means two or more unless expressly and specifically defined otherwise.

In the present disclosure, the term "illustrative" is used to mean "used as an example or illustration". Any embodiment described as "illustrative" in the present disclosure is not necessarily to be construed as preferred or advantageous over other embodiments. To enable any person skilled in the art to implement and use the present disclosure, the following description is given. In the following description, details are set forth for purposes of explanation. It will be appreciated by those of ordinary skill in the art that the present disclosure may be implemented without these specific details. In other instances, well-known structures and procedures will not be set forth in detail, so as to prevent unnecessary details from obscuring the description of the present disclosure. Accordingly, the present disclosure is not intended to be limited to the embodiments shown, but is to be accorded the widest scope consistent with the principles and features disclosed herein.

Some embodiments of the present disclosure provide a method and apparatus for configuring a color to be displayed by a lighting device, and a storage medium, which will be described in detail below.

In one or more embodiments of the present disclosure, colors may correspond to different color models including a Hue-Saturation-Intensity (HSI) model, a Correlated Color Temperature (CCT) model, and a hybrid model (Mlti) obtained by mixing the HSI model with the CCT model. Each color model corresponds to a color disc including all colors in the color model.

In one or more embodiments of the present disclosure, as for the HSI model, a color disc corresponding to the HSI model includes saturation and hue of a color. The hue determines a specific color, such as red and yellow. Since a color disc corresponding to the HSI model is generally circular in structure, the hue ranges from 0° to 360°. A saturation refers to a degree of brightness degree of a color, and the saturation generally ranges from 0 to 100%. Generally, saturation of a primary color is highest. As the saturation decreases, the color becomes dimmed until there is no color, i.e., a color that loses a hue.

As for the CCT model, a color disc corresponding to a CCT model has a continuous color temperature (from a cold color temperature to a warm color temperature). The color temperature is a unit of measurement indicating color components contained in light. Theoretically, black body temperature refers to the color that appears after the black body is heated from absolute zero (−273° C.). After heating, the black body gradually changes from black to red, turns yellow, turns white, and finally emits blue light. When heated to a certain temperature, spectral composition of the light emitted by the black body is called the color temperature at this temperature, and the measurement unit is "K" (Kelvin).

The CCT model includes not only the color temperature value but also a continuous G/M (Green/Magenta) value (duv), i.e., degree of deviation of hue of a light source from the black body color temperature. The G/M value includes Magenta and Green. Since the G/M value is also continuous, the G/M value is in fact continuous from Magenta to Green.

In one or more embodiments of the present disclosure, the color models may also include a hybrid model (Mlti) obtained by mixing the HSI model with the CCT model. The Mlti model includes both saturation and hue values of a color, as well as color temperature and G/M value of the color.

FIG. 1 is a schematic flowchart of a method of configuring a color to be displayed by a lighting device according to one or more embodiments of the present disclosure. As shown in FIG. 1, the method may include steps 11, 12 and 13.

At step 11, in response to a target color disc mode set by a user in preset multiple color disc modes, one or more initial color points is obtained according to a preset color point selection strategy for the target color disc.

In one or more embodiments of the present disclosure, since a color correspond to multiple color disc modes, it is necessary to determine a target color disc mode set by a user in preset multiple color disc modes. Only after determining the target color disc mode, the initial color point can be selected. That is, different color parameters of the initial color point can be obtained according to different color disc modes, including but not limited to hue, saturation, color temperature, G/M value, and the like.

It should be noted that in one or more embodiments of the present disclosure, the target color disc mode is the aforementioned HSI mode, or color temperature mode, or hybrid mode of HSI and color temperature. If the HSI mode is selected, only hue and saturation corresponding to the color point need to be obtained, without obtaining color temperature and G/M value corresponding to the color point. Similarly, if the color temperature mode is selected, only color temperature and G/M value corresponding to the color point need to be obtained, without obtaining hue and saturation corresponding to the color point.

Generally, each of multiple initial color points corresponds to a determined color parameter, including, but not limited to, determined hue, saturation, color temperature, G/M value, and the like. Moreover, in one or more embodiments of the present disclosure, methods for generating the color disc by using the multiple initial color points are different, and the number of the multiple initial color points selected may also be different. The multiple initial color points may be one, two, four, etc.

It should be noted that in one or more embodiments of the present disclosure, in response to determining that one or more initial color points is selected, a color parameter corresponding to the one or more initial color points is also obtained. The one or more initial color points may actually correspond to a color disc in which only one color point is included.

In one or more embodiments of the present disclosure, multiple new color points are actually generated by using one or more initial color points. Finally, a color disc including the one or more initial color points and the multiple new color points is obtained. The color disc includes multiple color points.

At step 12, the color disc is generated according to one or more initial color points.

At step 13, a color configuring is performed on a lighting device by using multiple color points in the color disc.

After generating a color disc using multiple initial color points, the color disc includes multiple color points. Each of the multiple color points corresponds to one color, and each color corresponds to a determined color parameter, including, but not limited to, determined hue, saturation, color temperature, G/M value, and the like.

Since each color in the generated color disc is unique and determined, a certain color can be directly obtained by using the color disc. And the lighting device is configured by using the obtained color, so that the lighting device directly displays the color. The color corresponding to each lighting device does not need to be manually adjusted. Even if there are multiple lighting devices, a determined color can be directly obtained from the color disc for display. The colors in the multiple lighting devices need not to be manually adjusted, thereby improving the efficiency of the color configuring of the lighting devices.

In the method of configuring a color to be displayed by a lighting device according to one or more embodiments of the present disclosure, any initial color point is obtained, and a color disc including multiple colors is generated according to the initial color point. The color disc is used to directly obtain a color to perform a color configuring on the lighting device. Color parameters in each lighting device do not need to be individually adjusted, so that accurate adjustment and control of the color configuring of the lighting device is realized. And the color configuring can be performed on multiple lighting devices at the same time, thereby improving the color configuring efficiency of the lighting devices.

As shown in FIG. 2, a process of generating a color disc based on multiple initial color points according to one or more embodiments of the present disclosure may include steps 21, 22 and 23.

At step 21, initial hue values respectively corresponding to any two initial color points are obtained.

In one or more embodiments, the color disc may correspond to the HSI model. Therefore, under the condition that any two initial color points are obtained, initial hue values corresponding to the initial color points may be obtained at the same time. The initial hue can be predefined. The saturations of the two initial color points may be randomly generated, or the saturation of the single initial color point may be manually adjusted, or the saturation of the uniform initial color point may be adjusted.

It should be noted that in one or more embodiments of the present disclosure, a hue range of the color points in the HSI model is 0-360°. Therefore, a range of the initial hue is also 0-360°.

At step 22, whether or not a hue value distance between the two initial color points is within a preset hue value distance range is determined based on the initial hue values respectively corresponding to the two initial color points.

After the initial hue values respectively corresponding to the two initial color points are obtained, it is also necessary to determine the hue value distance between the two initial color points. Since the hues of the color points are all angle values, the hue value distance between the two initial color points can be determined by directly obtaining difference between the two initial hue. Thus, the hue value distance between the two initial color points is obtained.

In above embodiments, after the hue value distance between the two initial color points is determined by using the initial hue values, it is also necessary to determine whether the hue value distance is within a preset hue value distance range. Generally, the preset hue value distance range may be 120°-180°, and includes two boundary values of 120° and 180°.

In one or more embodiments, the initial hue values respectively corresponding to the two initial color points may be 30° and 210°, respectively. The hue value distance may be a difference between 210° and 30°, i.e., 180°. At this time, the hue value distance is 180° and is within the preset hue value distance range.

At step 23, under the condition that the hue value distance between the two initial color points is within the preset hue value distance range, a color disc is generated according to the two initial color points.

If the hue value distance between the two initial color points is within the preset hue value distance range, a color disc may be generated according to the two initial color points. The color disc corresponds to an HSI model.

Figure 3:
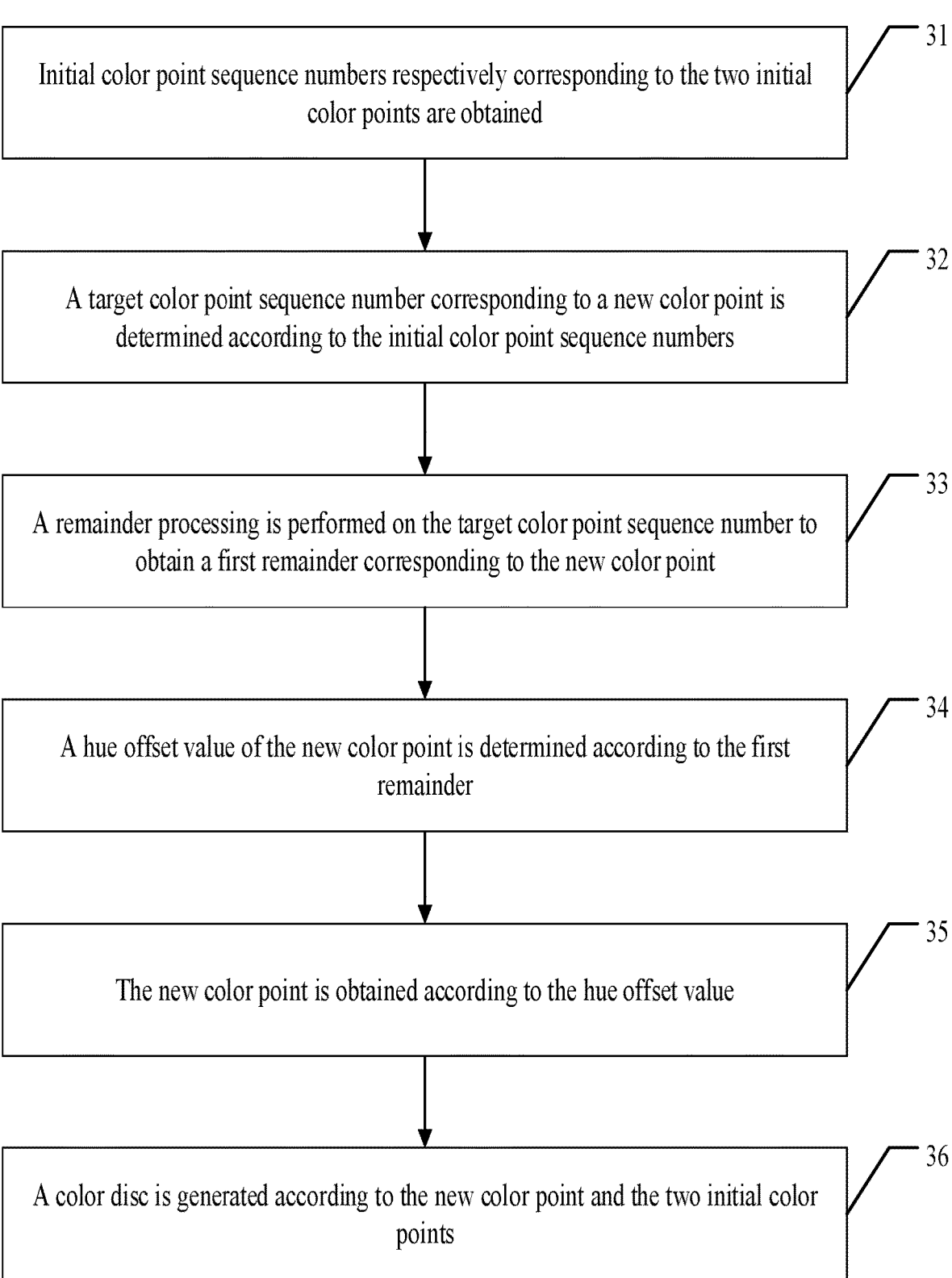
FIG. 3 is a schematic flowchart of a process of generating a color disc based on two initial color points according to one or more embodiments of the present disclosure.

As shown in FIG. 3, a process of generating a color disc based on two initial color points according to one or more embodiments of the present disclosure may include steps 31-36.

At step 31, initial color point sequence numbers respectively corresponding to the two initial color points are obtained.

In one or more embodiments of the present disclosure, each color point corresponds to one color point sequence number. The color point sequence number is generally an ordered integer starting from 1, so as to assign a value to a new color point in different modes.

At step 32, a target color point sequence number corresponding to a new color point is determined according to the initial color point sequence numbers.

In one or more embodiments of the present disclosure, two initial color points are obtained, and initial color point sequences respectively corresponding to the two initial color points are 1 and 2, respectively. That is, the two initial color points are an initial color point 1 and an initial color point 2, respectively.

Since the color disc includes multiple color points, generating the color disc based on the two initial color points in one or more embodiments of the present disclosure, in fact, is generating other color points in the color disc based on the two initial color points. That is, multiple new color points are generated by using the two initial color points, and the color disc is obtained according to the multiple new color points and the two initial color points. Since the color point sequence number is generally an ordered integer starting from 1, in one or more embodiments of the present disclosure, a target color point sequence number corresponding to the new color point is 3.

At step 33, a remainder processing is performed on the target color point sequence number to obtain a first remainder corresponding to the new color point.

In one or more embodiments of the present disclosure, after the target color point sequence number corresponding to the new color point is determined, the remainder processing needs to be performed on the target color point sequence number to determine the first remainder corresponding to the new color point. The difference in the remainder determines the difference in the hue offset value of the new color point relative to the initial color point.

It should be noted that, in one or more embodiments of the present disclosure, a remainder of 4 is generally taken by using the target color point sequence number. In one or more embodiments, if the target color point sequence number corresponding to the new color point is 3, then the remainder of 4 is taken from 3. The first remainder is 3.

At step 34, a hue offset value of the new color point is determined according to the first remainder.

In one or more embodiments of the present disclosure, different first remainders correspond to different hue offset values. Specifically, if the first remainder is 1 or 2, it is determined that the hue offset value is 0, that is, the hue of the new color point is same as the hue of the initial color point. If the first remainder is 3 or 0, then a range of the hue offset value is determined to be 0-60°.

In one or more embodiments, when the first remainder is 3, the range of the hue offset value of the new color point is 0-60°. And generally, a boundary value of 60° is not included. The specific hue offset value of the new color point may be arbitrarily selected in 0-60°, for example, 30°. In one or more embodiments, if the first remainder is 1, then the hue offset value is 0, and the hue of the new color point is same as the hue of the initial color point.

At step 35, the new color point is obtained according to the hue offset value.

In one or more embodiments of the present disclosure, the hue of the new color point can be determined according to the hue offset value of the new color point relative to the initial color point to obtain the new color point. Saturation of the new color point may be randomly generated. The saturation corresponding to the new color point is not equal to saturation of the initial color point.

At step 36, a color disc is generated according to the new color point and the two initial color points.

After determining the hue and saturation respectively corresponding to the new color point and the two initial color points, the position of the color point in the HSI model can be determined. Since the hue and the saturation of the initial color point may be customized, the hue and the saturation corresponding to the initial color point may be changed to generate different new color points. Positions of different new color points in the HSI model are determined. Finally, a complete color disc including multiple color points is obtained. At the same time, since the hue offset value corresponds to a range of offset values, different offset values may be obtained to obtain different new color points. Finally, the color disc is obtained. Note that a color param-eter such as hue and saturation corresponding to each color point in the color disc is determined. As shown in FIG. 4, a process of obtaining new color points based on a hue offset value according to one or more embodiments of the present disclosure may include steps 41, 42 and 43.

At step 41, one of the two initial color points is selected as a target initial color point.

Since in one or more embodiments of the present disclo-sure, the hue offset value is with respect to the initial color point, and there are also two initial color points, it is necessary to determine one target initial color point among the two initial color points. Specifically, one initial color point may be arbitrarily selected among the two initial color points as the target initial color point, so as to determine the hue offset value of the new color point relative to the target initial color point.

At step 42, a preset first color coordinate system is obtained, and a position of the target initial color point in the first color coordinate system is determined.

Each color disc corresponds to one color model. The color model is usually represented by a color coordinate system, i.e., each color disc corresponds to one color coordinate system. Therefore, in one or more embodiments of the present disclosure, a first color coordinate system, generally a coordinate system corresponding to the HSI model, is obtained. In the coordinate system, the color disc is circular, and includes a center and a radius R.

In above-described embodiments, a magnitude of an angle of the color point in the circular color disc represents hue, and a distance between the color point and the center of the circle represents saturation. For the target initial color point, the position of the target initial color point in the color disc may be determined according to the hue and saturation of the target initial color point.

At step 43, the position of the new color point in the first color coordinate system is determined according to the position of the target initial color point and the hue offset value, so as to add the new color point in the first color coordinate system.

After the position of the target initial color point in the first color coordinate system is determined, the hue offset value of the new color point relative to the target initial color point is known, and the saturation of the new color point may be customized, that is, the saturation of the new color point is also known. The position of the new color point in the first color coordinate system can be determined.

In above embodiments, there are actually two new color points. One new color point is a color point obtained by adding the hue offset value to the hue of the target initial color point, and an other new color point is a color point obtained by subtracting the hue offset value from the hue of the target initial color point. That is, the hue of the target initial color point may be taken as a center, and two new color points with equal hue offset values may be randomly generated within two included angles less than 60° on the left and right sides respectively. The two new color points are associated color points, and have a same color identifier.

And in one or more embodiments of the present disclo-sure, it is necessary to remove the target initial color point in the first color coordinate system and finally obtain the color disc. At this time, the color disc includes only three color points, one initial color point and two new color points, respectively.

In one or more embodiments of the present disclosure, after determining the position of the target initial color point in the first coordinate system, the position of the new color point in the circular color disc may also be determined according to the position of the target initial color in the first coordinate system. That is, the position of the new color point in the first coordinate system is determined.

Specifically, the color point in one or more embodiments of the present disclosure is also generally a circular color point. The circular color point also corresponds to a radius r. For the new color point, the radius r of the new circular color point is known, the hue "hue" of the new color point is known, and the saturation "sat" of the new color point is also known (usually randomly generated). In this case, the position coordinates of the center of the new color point may be determined. Specifically, the position coordinates of the center of the new color point may be calculated as follows:

$$\text{Center distance: } L=(\text{sat}/100\%)*(R-r)$$

$$\text{Center coordinate } x=R-r+L*\cos(\text{hue}/360°*\pi*2)$$

$$\text{Center coordinate } y=R-r-\sin(\text{hue}/360°*\pi*2)$$

where the center distance is a distance between the center of the new color point and the center of the circular color disc, the saturation "sat" is a percentage ranging between 0-100%, and the hue "hue" ranges between 0-360°. The position of the new color point in the circular color disc may be determined by using the above calculation formula, so as to determine the position of the new color point in the first color coordinate system.

FIG. 5 is a schematic diagram of the obtained new color points according to one or more embodiments of the present disclosure. In FIG. 5, initial color point sequences respec-tively corresponding to two initial color points are 1 and 2, respectively, that is, the two initial color points are an initial color point 1 and an initial color point 2, respectively. And a hue value distance between the initial color point 1 and the initial color point 2 is 180°. In this case, for a new color point, a color point sequence number corresponding to the new color point is 3. For the color point sequence number 3, remainder processing needs to be performed on 3. Specifically, a remainder of 4 is taken from 3, and a first remainder obtained is 3. A range of a hue offset value of the new color point relative to the target initial color point is 0-60°. A hue offset value may be arbitrarily selected within the range of 0-60°.

In FIG. 5, if the initial color point 1 is selected as the target initial color point, it is necessary to add the hue offset value to the hue of the initial color point 1 and subtract the hue offset value from the hue of the initial color point 1 respectively to obtain two new color points, namely, a new color point 1' and a new color point 3, respectively. The new color point 1' and the new color point 3 are a pair of associated color points. That is, the new color point 1' and the new color point 3 have a same color identifier.

The initial color point 1 is removed (shown in dashed lines in the figure), and only three color points are included. If the initial color point 2 is the target initial color point, the new color points obtained may be a new color point 2' and a new color point 4. Note that differences between the hue of the initial color point and the hues of the two new color points respectively are in a range of 0-60°.

Figure 6:
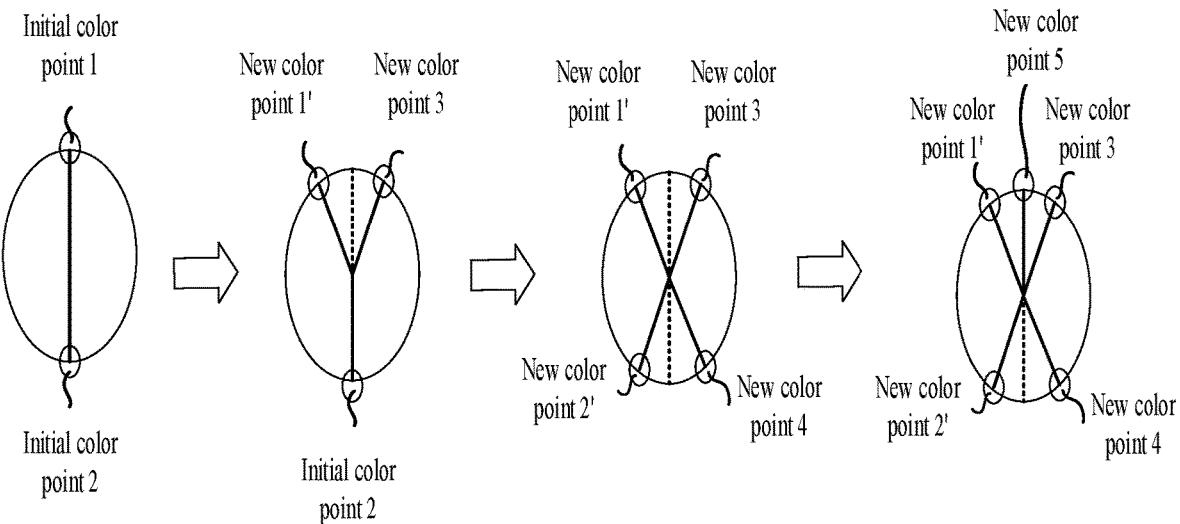
FIG. 6 is a schematic diagram of the obtained new color points according to another example of the present disclosure.

FIG. 6 is a schematic diagram of the obtained new color points according to another example of the present disclosure. In FIG. 6, at this time, the color points in the color disc include an initial color point 2, a new color point 1', and a new color point 3. If a new color point is to be further added, the initial color point 2 may be used as the target initial color point. In this case, a color point sequence number of the new color point is 4. After taking a remainder, the remainder is 0. Then, the hue offset value of the new color point is still within the range of 0-60°. Two new color points may be obtained according to the hue offset value, a new color point 2' and a new color point 4, respectively. And the new color point 2' and the new color point 4 are a pair of associated color points.

If a color point continues to be added, a color sequence number of the added color point is 5. After taking a remainder, the remainder is 1. In this case, the hue offset value of the new color point is 0. That is, in this case, the hue of the new color point is same as the hue of the target color point. Therefore, as shown in FIG. 6, the new color point 5 is generated at a position corresponding to the initial color point 1.

Note that in one or more embodiments of the present disclosure, when the remainder is 1 or 2, the new color point is one color point. When the remainder is 3 or 0, the new color point is two color points.

In one or more embodiments of the present disclosure, the color disc may also be generated using other methods. In one or more embodiments of the present disclosure, an initial color point having hue of 0 and saturation randomly generated may be obtained. Four new color points having hue of 0 and different saturations are generated according to the initial color points. The four new color points have a same hue as the initial color point, but the saturations are randomly generated and different from the saturation of the initial color point.

In one or more embodiments of the present disclosure, it is also possible to obtain two initial color points with hue values 180° apart. The saturations of the two initial color points are randomly generated. In this case, four new color points are generated by default, and hues of two of the four new color points are same as hue of one initial color point, and hues of other two new color points are same as hue of an other initial color point.

In this case, four new color points correspond to four color point sequence numbers, respectively. The four new color points may be assigned to the two initial color points with different hues respectively according to the color point sequence numbers; And the saturations of the four new color points are randomly generated and are not same as the saturations of the two initial color points.

In one or more embodiments of the present disclosure, it is also possible to obtain three initial color points with hues 120° apart from each other. The saturations of the three initial color points are randomly generated. In this case, six new color points are generated by default. Each initial color point has two new color points with a same hue but different saturations.

In this case, the six new color points correspond to the six color point sequence numbers. The six new color points may be respectively assigned to the three initial color points with different hues according to the color point sequence number. And the saturations of the six new color points are randomly generated and are not same as the saturations of the three initial color points.

In one or more embodiments of the present disclosure, it is also possible to obtain any initial color point and an initial hue corresponding to the initial color point. Multiple new color points are randomly generated within a range of the initial hue plus or minus 60°. The saturations of the multiple new color points cannot be same as the saturation of the initial color point, thereby obtaining the color disc.

It should be noted that the color disc in the HSI model is described in above embodiments. Only the hue and saturation of the color point are adjusted to obtain the color disc.

The color model may include a CCT model. A second color coordinate system corresponding to the CCT model is different from the first color coordinate system. And the color temperature and G/M value of the color point are included in the second color coordinate system, but not the hue and saturation. Therefore, in one or more embodiments of the present disclosure, it is also possible to determine the new color point in the CCT model to generate the color disc in the CCT model.

Figure 7:
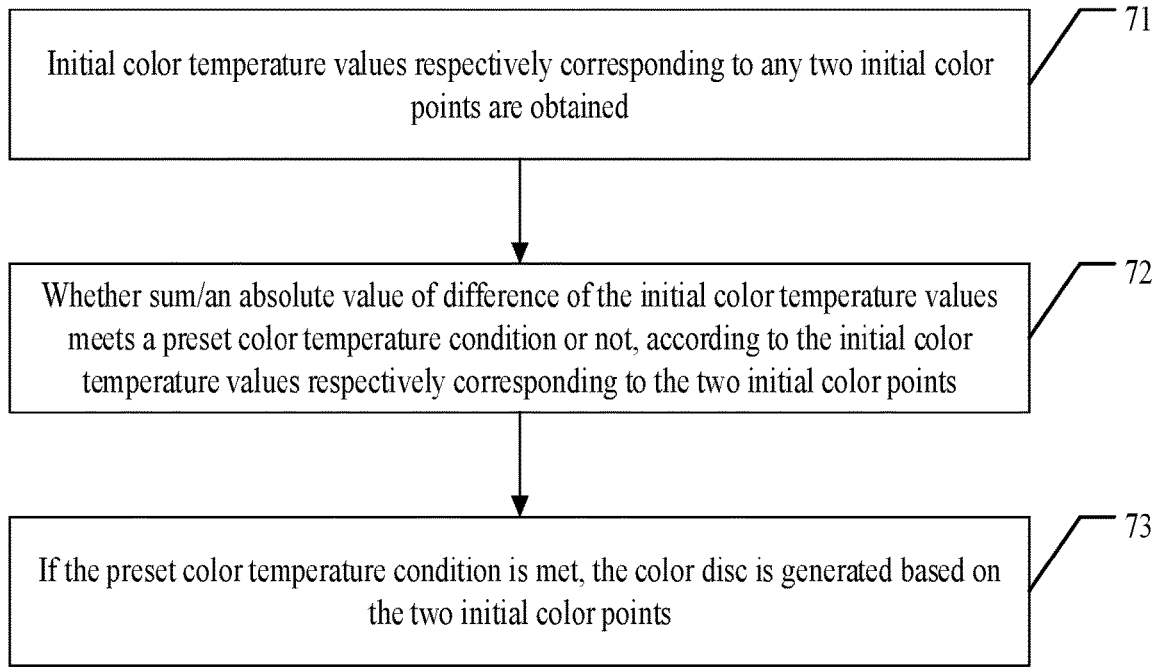
FIG. 7 is a schematic flowchart of a process of generating a color disc based on one or more initial color points according to one or more embodiments of the present disclosure.

As shown in FIG. 7, a process of generating a color disc based on one or more initial color points according to one or more embodiments of the present disclosure may include steps 71, 72 and 73.

At step 71, initial color temperature values respectively corresponding to any two initial color points are obtained.

Since the color in one or more embodiments is in the CCT model, the initial color temperature values respectively corresponding to the two initial color points are obtained instead of the hues.

At step 72, whether sum/an absolute value of difference of the initial color temperature values meets a preset color temperature condition or not, according to the initial color temperature values respectively corresponding to the two initial color points.

After the initial color temperature values respectively corresponding to the two initial color points are obtained, it is also necessary to determine whether the sum of the two initial color temperature values or the absolute value of the difference between the two initial color temperature values meets the preset color temperature condition. And in one or more embodiments of the present disclosure, the predetermined color temperature condition corresponding to the sum of the two initial color temperature values is different from the predetermined color temperature condition corresponding to the absolute value of the difference between the two initial color temperature values.

In one or more embodiments of the present disclosure, since the color temperature ranges from 1600 Kelvin (K)-10000 Kelvin (K), the sum of the two initial color temperature values must be a positive number. Determining whether the sum of the two initial color temperature values meets the preset color temperature condition may include determining whether an average color temperature of the two initial color temperature values is equal to 5600K. If not, the initial color temperature values need to be adjusted. A subsequent determination can be made only if the average color temperature of the two initial color temperature values is equal to 5600K.

In one or more embodiments of the present disclosure, since the difference between the two initial color temperature values may be a negative number, it is necessary to determine the absolute value of the difference between the two initial color temperature values. Determining whether the absolute value of the difference between the two initial color temperature values meets a predetermined color temperature condition may include determining whether a color temperature obtained by dividing the absolute value of the difference between the two initial color temperature values by 2 is equal to 1200K. If not, it is necessary to adjust the two initial color temperature values so that the color temperature obtained by dividing the absolute value of the difference between the two initial color temperature values by 2 is equal to 1200K.

At step 73, if the preset color temperature condition is met, the color disc is generated based on the two initial color points.

In one or more embodiments of the present disclosure, only when the sum of the two initial color temperature values meets the preset color temperature condition or the absolute value of the difference between the two initial color temperature values meets the preset color temperature condition, the color disc in the CCT model can be generated according to the two initial color points.

As shown in FIG. 8, a process of generating a color disc based on two initial color points according to one or more embodiments of the present disclosure may include steps 81~86.

At step 81, if sum/an absolute value of difference of the initial color temperature values meets a preset color temperature condition, initial color point sequence numbers respectively corresponding to the two initial color points are obtained.

In one or more embodiments of the present disclosure, although a preset color temperature condition corresponding to the sum of the initial color temperature values and a preset color temperature condition corresponding to the absolute value of the difference between the initial color temperature values are different, a new color point is subsequently obtained by using a color temperature offset value. Therefore, whether the sum of the initial color temperature values meets the preset color temperature condition or the absolute value of the difference between the initial color temperature values meets the preset color temperature condition, the color temperature offset value may be determined by method steps in the present disclosure, and the color disc is generated.

If the preset color temperature condition is met, the initial color point sequence numbers respectively corresponding to the two initial color points may be obtained. As described in the HSI model for color points, the two initial color point sequence numbers may be 1 and 2, respectively. That is, the initial color points are an initial color point 1 and an initial color point 2, respectively.

At step 82, a target color point sequence number corresponding to the new color point is determined according to the initial color point sequence numbers.

In one or more embodiments, the target color point sequence number corresponding to the new color point may also be determined according to the initial color point sequence numbers respectively corresponding to the two initial color points. Specifically, when the two initial color point sequence numbers may be 1 and 2, respectively, the new color point sequence number may be 3.

At step 83, remainder processing is performed on the target color point sequence number to obtain a second remainder corresponding to the new color point.

In one or more embodiments, the new color point is also determined by a offset value. But in one or more embodiments, a color temperature offset value is obtained instead of a hue offset value. Specifically, the second remainder corresponding to the new color point may also be obtained by performing the remainder processing on the target color point sequence number. In one or more embodiments, a remainder of 4 may be obtained by using the target color point sequence number.

At step 84, the color temperature offset value of the new color point is determined according to the second remainder.

In one or more embodiments, the color temperature offset value of the new color point is also determined by using the second remainder. If the remainder is 1 or 2, it is determined that the color temperature offset value is 0, that is, the color temperature of the new color point is same as the color temperature of the initial color point. If the remainder is 3 or 0, it is determined that a range of the color temperature offset value is 0-1000 Kelvin.

In one or more embodiments, when the second remainder is 3, the range of the color temperature offset value of the new color point is 0-1000K. And generally, a boundary value 1000K is not included. A specific color temperature offset value of the new color point may be arbitrarily selected in 0-1000K, for example, 500K. In one or more embodiments, if the first remainder is 1, the color temperature offset value is 0, and the color temperature of the new color point is same as the color temperature of the initial color point.

At step 85, the new color point is obtained according to the color temperature offset value.

In one or more embodiments of the present disclosure, the color temperature of the new color point may be determined according to the color temperature offset value of the new color point relative to the initial color point so as to obtain the new color point. G/M value of the new color point may be randomly generated, and the G/M value of the new color point is not equal to the G/M value of the initial color point.

At step 86, the color disc is generated according to the new color point and the two initial color points.

After determining color temperatures and G/M values respectively corresponding to the new color point and the two initial color points, positions of color points in the CCT model can be determined. However, since the color temperature and the G/M value of the initial color point may be customized, the color temperature and the G/M value corresponding to the initial color point may be changed. Different new color points are generated, and positions of the different new color points in the CCT model are determined. Finally, a complete color disc including multiple color points is obtained. And the color temperature and the G/M value corresponding to each color point in the color disc is determined.

As shown in FIG. 9, a process of obtaining new color points based on a color temperature offset value according to one or more embodiments of the present disclosure may include steps 91, 92 and 93.

At step 91, one of two initial color points is selected as a target initial color point.

In one or more embodiments of the present disclosure, the color temperature offset value is with respect to the initial color point, and there are two initial color points. Therefore, it is necessary to determine the target initial color point among the two initial color points. Specifically, one initial color point may be arbitrarily selected among the two initial color points as the target initial color point so as to determine the color temperature offset value of the new color point relative to the target initial color point.

At step 92, a preset second color coordinate system is obtained, and a position of the target initial color point in the second color coordinate system is determined.

In one or more embodiments, the second color coordinate system corresponds to a CCT model. Generally, the CCT model is a regular rectangular having a length of H and a width of W. A long side of the rectangular corresponds to the color temperature. A short side corresponds to the G/M value. For the target initial color point, a position of the target initial color point in the color disc may be determined according to the color temperature and the G/M value corresponding to the target initial color point.

In one or more embodiments of the present disclosure, the position of the target initial color point in the color disc may be determined by the following formula including:

$$\text{unit offset value "offset"} = (\max - \min)/W$$

$$X = (cct - \min)/\text{offset}$$

$$Y = gm*(H/20)$$

where max and min are the maximum value and the minimum value of the color temperature, respectively, and are specifically 1600K and 10000K, respectively, so that difference between max and min is a determined value and the unit offset value varies mainly according to the width W in the CCT model; X and Y are the abscissa and ordinate of the initial target color point, respectively; cct is the color temperature value of the initial target color point, gm is the G/M value of the initial target color point, and both cct and gm are known.

At step 93, the position of the new color point in the second color coordinate system is determined according to the position of the target initial color point and the color temperature offset value, so as to add the new color point in the second color coordinate system.

After the position of the target initial color point in the second color coordinate system is determined, since the color temperature offset value of the new color point relative to the target initial color point is known, and the G/M value of the new color point may be customized, that is, the G/M value of the new color point is also known, the position of the new color point in the second color coordinate system can be determined.

In above embodiments, there are actually two new color points. One color point is a color point obtained by adding the color temperature offset value to the color temperature of the target initial color point, and an other color point is a color point obtained by subtracting the color temperature offset value from the color temperature of the target initial color point. That is, the color temperature of the target initial color point may be taken as a center, and two new color points with equal color temperature offset values are randomly generate within two ranges less than 1000K on the left and right sides respectively.

And in one or more embodiments of the present disclosure, it is necessary to remove the target initial color point in the second color coordinate system and finally obtain the color disc. In this case, the color disc includes only three color points, one initial color point and two new color points, respectively.

Note that in one or more embodiments of the present disclosure, if color temperatures of the two new color points generated exceed an actual color temperature range of 1600K-10000K, the color temperature offset value needs to be regenerated to ensure that the color temperatures of the new color points are within 1600K-10000K.

In one or more embodiments of the present disclosure, the initial color point numbers of the two initial color points are 1 and 2, respectively, that is, the two initial color points are the initial color point 1 and the initial color point 2, respectively. And a sum of the color temperatures of the two initial color points meets the preset color temperature condition. In this case, if a new color point is added, the color point sequence number corresponding to the new color point is 3. With respect to the color point sequence number 3, the remainder processing needs to be performed on the color point sequence number 3. Specifically, a remainder of 4 may be taken from 3, and the first remainder obtained is 3. The color temperature offset value of the new color point relative to the target initial color point ranges from 0 to 1000K. A color temperature offset value may be arbitrarily selected in the range of 0-1000K.

If the initial color point 1 is selected as the target initial color point, the color temperature of the initial color point 1 needs to be plus the color temperature offset value and minus the color temperature offset value respectively, so as to obtain two new color points, namely, the new color point 1' and the new color point 3, respectively. The new color point 1' and the new color point 3 are a pair of associated color points. That is, the new color point 1' and the new color point 3 have a same color identifier.

In one or more embodiments of the present disclosure, any one initial color point and the initial color temperature corresponding to the initial color point may be obtained at the same time. Multiple new color points are randomly generated within a range of the initial color temperature plus or minus 1200K. The G/M values of the multiple new color points may be randomly generated, and cannot be same as the G/M values of the initial color points, thereby obtaining the color disc.

In one or more embodiments of the present disclosure, when the color disc corresponding to the HSI model or the color disc corresponding to the CCT model is generated, the color configuring can be performed on the lighting device by using the color disc. In addition, not only the color configuring can be performed on one lighting device by using the color disc, but also the color configuring can be performed on multiple lighting device by using the color disc at the same time.

FIG. 10 is a schematic diagram of an operation interface according to one or more embodiments of the present disclosure. The color disc shown in FIG. 10 is a color disc corresponding to the HSI model and a color disc corresponding to the CCT model. No matter which color disc it is, it includes multiple color points, and each color point corresponds to one color. For a HSL color disc, the hue and saturation corresponding to each color are determined. For a color temperature color disc, the color temperature and G/M value corresponding to each color are determined.

In the operation interface shown in FIG. 10, controls that can adjust color parameters such as hue, saturation, color temperature, and G/M value are also included. The color parameters corresponding to the color point can be adjusted by using the controls. In FIG. 10, there may be also a color block corresponding to the color point one by one. A color displayed by the color block is the same as a color selected by the user in the color disc. The color block may facilitate the user to determine the selected color.

In the operation interface shown in FIG. 10, names of the multiple lighting devices may also be included. Each name corresponds to one lighting device. The color point (or color block) may be matched with the lighting device so that the lighting device displays a color corresponding to the color point (or color block).

Specifically, a user may adjust a color parameter of a certain color point to obtain a new color point. After the color parameter is determined, the new color point is mapped in the lighting device in a default order. Alternatively, the user clicks to select a different color block manually, and clicks a control corresponding to the lighting device. The color corresponding to the color block is mapped to the corresponding lighting device. Alternatively, the user drags the color block to the lighting device directly by a long pressing, so that the lighting device displays the color corresponding to the color block.

In one or more embodiments of the present disclosure, if the user selects the color block 1, the lighting device 1 and the lighting device 2, the user may drag the color block 1 to controls corresponding to the lighting device 1 and the lighting device 2 by dragging or the like, so that the lighting device 1 and the lighting device 2 display the color corresponding to the color block 1 at the same time.

If the color in the lighting device needs to be adjusted, it is only necessary to directly adjust the color parameter corresponding to the color point, without separately adjusting the color parameter in each lighting device. Thus, the operation can effectively improve the color configuring efficiency of the lighting device.

In above embodiments, it is also possible to perform the color configuring on multiple lighting devices at the same time by using the color disc. Referring to FIG. 10, in FIG. 10, the colors of the lighting device 1 and the lighting device 2 may correspond to the color in the color block 1 at the same time. Thus, when the color of the color block 1 is adjusted, the colors of the lighting device 1 and the lighting device 2 are adjusted at the same time, so that the colors of the multiple lighting devices are adjusted at the same time. Thus, the color configuring efficiency of the lighting device is greatly improved.

It should be noted that in one or more embodiments of the present disclosure, the color model further includes a hybrid model obtained by mixing the HSI model and the CCT model. In the hybrid model, parameters such as hue, saturation, color temperature, and G/M value of the color may be adjusted at the same time to adjust the color. A specific process may refer to the foregoing, and will not be repeated herein.

In one or more embodiments of the present disclosure, when the color disc is generated and the color configuring is performed on the lighting device by using the color disc, the color disc may be adjusted again. the color configuring is performed on the lighting device by using the adjusted color disc.

In one or more embodiments of the present disclosure, obtaining an adjusted color disc may include: in response to an operation of a user to adjust a color parameter of the target color point in the first color disc, determining a target color point that needs to be adjusted in the first color disc; adjusting color parameters of all color points in the first color disc except the target color point while adjusting the color parameter of the target color point, so as to obtain a second color disc when; performing color configuring on the lighting device by using the second color disc. The first color disc is the color disc generated by using the offset value described in the foregoing. And the second color disc is an adjusted color disc.

Specifically, in one or more embodiments of the present disclosure, a user may operate on the color point in the color disc to change the color parameter corresponding to the color point, including, but not limited to, hue, saturation, color temperature, G/M value, and the like of a color. Also, since multiple color points are included in the color disc, it is necessary to determine a target color point that the user needs to adjust in the first color disc.

In one or more embodiments of the present disclosure, the color parameters of all the color points in the first color disc except the target color point change as the parameter of the target color point is changed. And in one or more embodiments of the present disclosure, changes of the target color point and all color points in the first color disc except the target color point are same.

For example, the hue/color temperature of the target color point is increased, and the hues/color temperatures of all color points in the first color disc except the target color point are increased by a same value. The second color disc is obtained. Alternatively, the saturation of the target color point is increased, and the saturations of all the color points in the first color disc except the target color point are increased by a same value. The second color disc is obtained.

Using the second color disc, by changing the color parameter of the target color point in the color disc, the color parameters of all the color points in the color discs can be changed at the same time. Thus, the operation is convenient and fast, and the color adjustment efficiency of the color discs is greatly improved.

After the second color disc is obtained by the above method, the color configuring may be performed on the lighting device by using the second color disc. Specifically, any color point in the second color disc may be selected by the user, and the selected color point is mapped to the lighting device to realize display.

In one or more embodiments of the present disclosure, obtaining an adjusted color disc may include: in response to an operation of a user to adjust the color parameter of the target color point in the first color disc, determining an associated color point in the first color disc associated with the target color point; adjusting a color parameter corresponding to the associated color point in the first color disc to obtain the second color disc while adjusting the color parameter of the target color point; and performing color configuring to the lighting device by using the second color disc.

Specifically, the first color disc is the color disc generated by the offset value described in the foregoing. And the second color disc is an adjusted color disc. In one or more embodiments, when the target color point is adjusted, only color parameters of part of the associated color points associated with the target color point are adjusted, rather than the color parameters of all the color points.

In one or more embodiments of the present disclosure, determining the associated color point may include: obtaining a first color identifier corresponding to the target color point; obtaining one or more second color identifiers respectively corresponding to all color points in the first color disc except the target color point; determining whether the first color identifier matches with at least one of the one or more second color identifiers; and if the first color identifier matches with at least one of the one or more second color identifiers, obtaining an associated color point corresponding to the matched second color identifier.

Specifically, in one or more embodiments of the present disclosure, each color point corresponds to one color identifier (ID) to distinguish different color points. Generally, color points correspond to IDs one by one. Each color point corresponds to only one ID. Obtaining the first color identifier corresponding to the target color point includes obtaining an ID corresponding to the target color point.

In one or more embodiments of the present disclosure, in addition to obtaining the first color identifier corresponding to the target color point, it is necessary to obtain one or more second color identifiers respectively corresponding to all color points in the first color disc except the target color point. Further, the target color point associated with the target color point is determined according to the first color identifier and the second color identifier.

If the first color identifier matches with at least one of the one or more second color identifiers, two matched color points may be considered to be associated. In this case, determine the color point corresponding to the matched second color identifier may be determined as the associated color point. Specifically, that the first color identifier matches with the second color identifier may include that the first color identifier and the second color identifier are same. That is, color identifiers of color points associated with each other are same.

In one or more embodiments of the present disclosure, determining the associated color point may include: arbitrarily selecting at least one color point among all color points in the first color disc except the target color point; obtaining the first color identifier corresponding to the target color point; binding the first color identifier to at least one color point to bind the at least one color point to the target color point, the at least one color point being an associated color point.

In one or more embodiments of the present disclosure, different color points may also be re-bound. Specifically, at least one color point may be arbitrarily selected among all color points in the first color disc except the target color point. It is also necessary to obtain the first color identifier corresponding to the target color point.

In this case, it is necessary to bind the first color identifier to the selected at least one color point, and the color identifier corresponding to the selected at least one color point is changed into the first color identifier. In this case, the color identifier of the at least one color point and the color identifier of the target color point are same and both are the first color identifier. That is, the selected at least one color point is bound to the target color point, and the selected at least one color point is the associated color point.

In one or more embodiments, when the color parameter corresponding to the target color point is adjusted, the color parameter of the associated color point is also adjusted at the same time. In one or more embodiments, if the hue of the target color point is rotated by m degrees, the hue of the associated color point is also rotated by m degrees. Alternatively, if the saturation of the target color point moves n in a radial direction, the saturation of the associated color point moves n in a radial direction.

In one or more embodiments of the present disclosure, the color parameters corresponding to color point includes, but is not limited to, hue, saturation, color temperature, G/M value, and the like. Therefore, when one of the parameters of the target color point is actually adjusted, a same parameter of the associated color point may be adjusted at the same time, and a same adjustment is made. However, other color parameters of the target color point and the associated color point are not bound.

Specifically, when the hue corresponding to the target color point is increased, the hue corresponding to the associated color point may be increased at the same time. However, when the color temperature corresponding to the target color point is increased, the color temperature corresponding to the associated color point remains unchanged.

That is, in one or more embodiments of the present disclosure, the associated color point and the target color point may be only bound by part of the color parameters, or may be bound by all color parameters.

Figure 11:
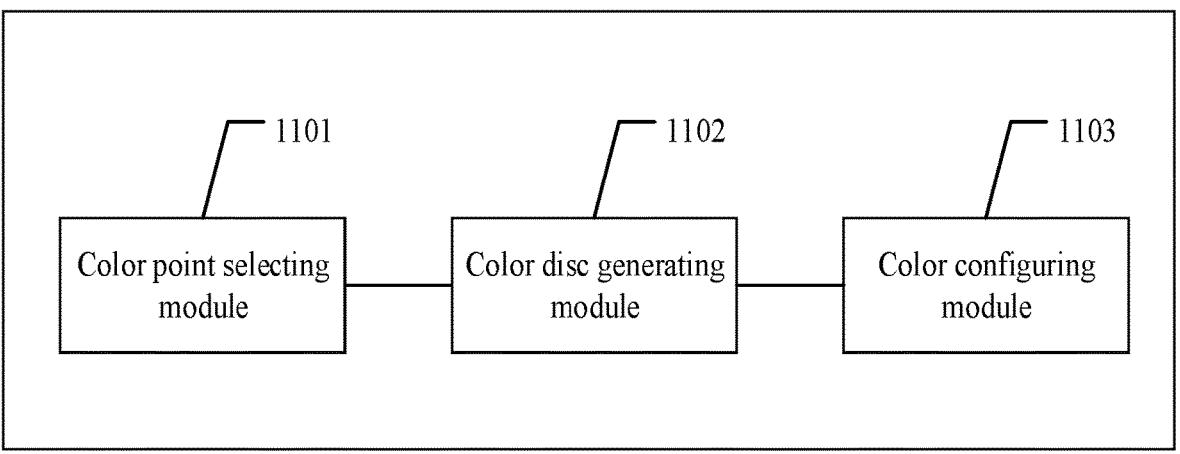
FIG. 11 is a schematic block diagram of an apparatus for configuring a color to be displayed by a lighting device according to one or more embodiments of the present disclosure.

One or more embodiments of the present disclosure also provide an apparatus for configuring a color to be displayed by a lighting device. As shown in FIG. 11, the apparatus may include a color point selecting module 1101, a color disc generating module 1102 and 1103.

A color point selecting module 1101 is configured to, in response to a target color disc mode set by a user in preset multiple color disc modes, obtain one or more initial color points according to a preset color point selection strategy for the target color disc mode.

A color disc generating module 1102 is configured to generate a color disc based on one or more initial color points. The color disc includes multiple color points. Each of the multiple color points corresponds to one color.

A color configuring module 1103 is configured to perform a color configuring on the lighting device by using the multiple color points in the color disc.

With respect to the color configuring apparatus of the lighting device according to one or more embodiments of the present disclosure, any initial color point is obtained, the color disc including multiple colors is generated according to the initial color point, and directly obtaining colors by using the color disc to perform the color configuring on the lighting device. Color parameters in each lighting device do not need to be individually adjusted, so that accurate adjustment and control of the color configuring of the lighting device can be realized. The color configurings for multiple lighting devices can be performed at the same time, thereby improving the color configuring efficiency of the lighting device.

According to one or more embodiments of the present disclosure, a server includes:

one or more processors; a memory; and one or more application programs. The one or more application programs are stored in the memory and executable by the processors to perform steps of any one of above methods of configuring a color to be displayed by a lighting device.

Figure 12:
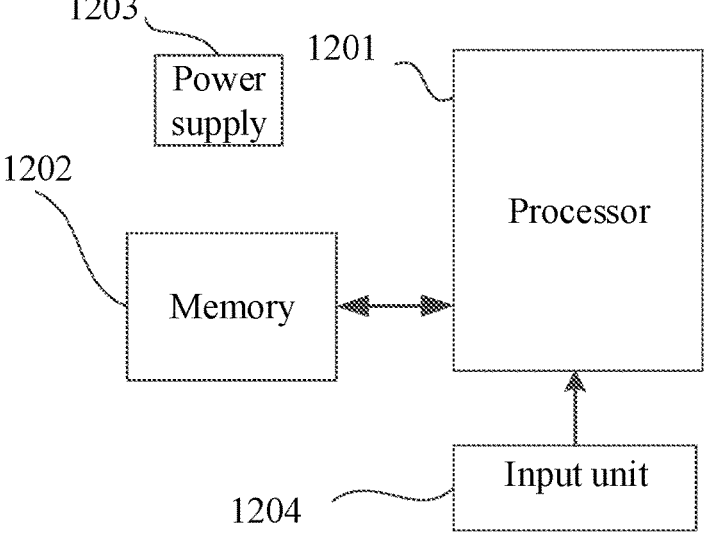
FIG. 12 is a schematic block diagram of a server according to one or more embodiments of the present disclosure.

As shown in FIG. 12, FIG. 12 is a schematic block diagram of a server according to one or more embodiments of the present disclosure.

The server may include components such as one or more processor 1201, a memory 1202, a power supply 1203, and an input unit 1204. It will be appreciated by those skilled in the art that the server structure shown in FIG. 12 does not constitute a limitation on the server, and may include more or less components than illustrated, or may combine certain components, or may include different component arrangements. Specifically, in one or more embodiments of the present disclosure, the processor 1201 in the server loads executable files corresponding to processes of one or more application programs into the memory 1202 according to following instructions, and the processor 1201 runs the one or more application programs stored in the memory 1202, thereby implementing various functions. The instructions are as follows:

in response to a target color disc mode set by a user in preset multiple color disc modes, obtaining one or more initial color points according to a preset color point selection strategy for the target color disc mode; generating a color disc based on the one or more initial color points, the color disc including multiple color points, each of the multiple color points corresponding to one color; and performing color configuring on a lighting device by using the multiple color points included in the color disc.

It will be appreciated by those ordinary skilled in the art that all or part of steps of various methods of above-described embodiments may be performed by instructions or relevant hardware controlled by instructions. The instructions may be stored in a computer-readable storage medium and loaded and executed by a processor.

According to one or more embodiments of the present disclosure, a storage medium may include a Read Only Memory (ROM), a Random Access Memory (RAM), a magnetic disk, an optical disk, or the like. The storage medium stores multiple instructions that can be loaded by a processor to perform steps in any one of the color configuring methods of the lighting device according to one or more embodiments of the present disclosure. For example, the instruction may perform the following steps:

in response to a target color disc mode set by a user in preset multiple color disc modes, obtaining one or more initial color points according to a preset color point selection strategy for the target color disc mode; generating a color disc based on the one or more initial color points, the color disc including multiple color points, each of the multiple color points corresponding to one color; and performing color configuring on a lighting device by using the multiple color points included in the color disc.

In above-mentioned embodiments, description of each embodiment has its own emphasis. For parts not described in detail in one or more embodiments, reference may be made to the above detailed description for another embodiment, which is not repeated herein.

The above embodiments are described in detail to assist in understanding of the present disclosure. Many modifications or equivalent substitutions with respect to the embodiments may occur to those skilled in the art based on the teachings of the present disclosure. In summary, the content of the specification is not to be construed as limiting the present disclosure.

What is claimed is:

1. A method of configuring a color to be displayed by a lighting device, the method comprising:

in response to determining that a target color disc mode of a plurality of preset color disc modes is set by a user, obtaining a plurality of initial color points according to a preset color point selection strategy for the target color disc mode;

generating a color disc based on the plurality of initial color points, wherein the color disc comprises a plurality of color points, and each of the plurality of color points corresponds to a color; and performing color configuring on the lighting device by using the plurality of color points included in the color disc, wherein the generating of the color disc based on the plurality of initial color points comprises:

obtaining initial hue values respectively corresponding to any two initial color points of the plurality of initial color points;

determining, based on the initial hue values, whether a hue value distance between the two initial color points is within a preset hue value distance range; and generating the color disc based on the two initial color points in response to determining that the hue value distance is within the preset hue value distance range.

2. The method according to claim 1, wherein the generating of the color disc based on the two initial color points comprises:

obtaining initial color point sequence numbers respectively corresponding to the two initial color points;

determining a target color point sequence number corresponding to a new color point based on the initial color point sequence numbers;

performing remainder processing on the target color point sequence number to obtain a first remainder corresponding to the new color point;

determining a hue offset value of the new color point based on the first remainder;

obtaining the new color point based on the hue offset value; and generating the color disc based on the new color point and the two initial color points.

3. The method according to claim 2, wherein the determining of the hue offset value of the new color point based on the first remainder comprises one of:

in response to determining that the first remainder is 1 or 2, determining the hue offset value to be 0; and in response to determining that the first remainder is 3 or 0, determining the hue offset value to be in a range of 0-60°.

4. The method according to claim 2, wherein the obtaining of the new color point based on the hue offset value comprises:

selecting one of the two initial color points as a target initial color point;

obtaining a preset first color coordinate system, and determining a position of the target initial color point in the first color coordinate system; and determining a position of the new color point in the first color coordinate system based on the position of the target initial color point and the hue offset value, to add the new color point in the first color coordinate system.

5. The method according to claim 4, wherein the generating of the color disc based on the new color point and the two initial color points comprises:

removing the target initial color point from the first color coordinate system; and generating the color disc based on the new color point and one of the two initial color points other than the target initial color point.

6. A server, comprising:

a processor; and a memory storing an application program executable by the processor to the method according to claim 1.

7. A non-transitory computer readable storage medium, having stored thereon a computer program executable by a processor to perform the method according to claim 1.

8. The non-transitory computer readable storage medium according to claim 3, wherein the generating of the color disc based on the two initial color points comprises:

obtaining initial color point sequence numbers respectively corresponding to the two initial color points;

determining a target color point sequence number corresponding to a new color point based on the initial color point sequence numbers;

performing remainder processing on the target color point sequence number to obtain a first remainder corresponding to the new color point;

determining a hue offset value of the new color point based on the first remainder;

obtaining the new color point based on the hue offset value; and generating the color disc based on the new color point and the two initial color points.

9. The non-transitory computer readable storage medium according to claim 8, wherein the obtaining of the new color point based on the hue offset value comprises:

selecting one of the two initial color points as a target initial color point;

obtaining a preset first color coordinate system, and determining a position of the target initial color point in the first color coordinate system; and determining a position of the new color point in the first color coordinate system based on the position of the target initial color point and the hue offset value, to add the new color point in the first color coordinate system.

10. A method of configuring a color to be displayed by a lighting device, the method comprising:

in response to determining that a target color disc mode of a plurality of preset color disc modes is set by a user, obtaining a plurality of initial color points according to a preset color point selection strategy for the target color disc mode;

generating a color disc based on the plurality of initial color points, wherein the color disc comprises a plurality of color points, and each of the plurality of color points corresponds to a color; and performing color configuring on the lighting device by using the plurality of color points included in the color disc, wherein the generating of the color disc based on the plurality of initial color points comprises:

obtaining initial color temperature values respectively corresponding to any two initial color points of the plurality of initial color points; and in response to determining that a sum of the initial color temperature values or an absolute value of difference between the initial color temperature values meets a preset color temperature condition, generating the color disc based on the two initial color points.

11. The method according to claim 10, wherein the generating of the color disc based on the two initial color points comprises:

obtaining initial color point sequence numbers respectively corresponding to the two initial color points;

determining a target color point sequence number corresponding to a new color point based on the initial color point sequence numbers;

performing remainder processing on the target color point sequence number to obtain a second remainder corresponding to the new color point;

determining a color temperature offset value of the new color point based on the second remainder;

obtaining the new color point based on the color temperature offset value; and generating the color disc based on the new color point and the two initial color points.

12. The method according to claim 11, wherein the determining of the color temperature offset value of the new color point based on the second remainder comprises one of:

in response to determining that the second remainder is 1 or 2, determining the color temperature offset value to be 0; and in response to determining that the second remainder is 3 or 0, determining the color temperature offset value to be in a range of 0-1000 Kelvin.

13. The method according to claim 11, wherein the obtaining of the new color point based on the color temperature offset value comprises:

selecting one of the two initial color points as a target initial color point;

obtaining a preset second color coordinate system, and determining a position of the target initial color point in the second color coordinate system; and determining a position of the new color point in the second color coordinate system based on the position of the target initial color point and the color temperature offset value, to add the new color point in the second color coordinate system.

14. The method according to claim 13, wherein the generating of the color disc based on the new color point and the two initial color points comprises:

removing the target initial color point from the second color coordinate system; and generating the color disc based on the new color point and one of the two initial color points other than the target initial color point.

15. A server, comprising:

a processor; and a memory storing an application program executable by the processor to perform the method according to claim 10.

16. A non-transitory computer readable storage medium, having stored thereon a computer program executable by a processor to perform the method according to claim 10.

17. The non-transitory computer readable storage medium according to claim 16, wherein the generating of the color disc based on the two initial color points comprises:

obtaining initial color point sequence numbers respectively corresponding to the two initial color points;

determining a target color point sequence number corresponding to a new color point based on the initial color point sequence numbers;

performing remainder processing on the target color point sequence number to obtain a second remainder corresponding to the new color point;

determining a color temperature offset value of the new color point based on the second remainder;

obtaining the new color point based on the color temperature offset value; and generating the color disc based on the new color point and the two initial color points.

18. The non-transitory computer readable storage medium according to claim 17, wherein the determining of the color temperature offset value of the new color point based on the second remainder comprises one of:

in response to determining that the second remainder is 1 or 2, determining the color temperature offset value to be 0; and in response to determining that the second remainder is 3 or 0, determining the color temperature offset value to be in a range of 0-1000 Kelvin.

19. The non-transitory computer readable storage medium according to claim 17, wherein the obtaining of the new color point based on the color temperature offset value comprises:

selecting one of the two initial color points as a target initial color point;

obtaining a preset second color coordinate system, and determining a position of the target initial color point in the second color coordinate system; and determining a position of the new color point in the second color coordinate system based on the position of the target initial color point and the color temperature offset value, to add the new color point in the second color coordinate system.

* * * * *